United States Patent Office 3,507,834
Patented Apr. 21, 1970

3,507,834
FILAMENTS OF SEGMENTED ELASTOMERS FROM STERICALLY HINDERED TERTIARY ARALKYL DIISOCYANATES AND DIAMINES
Emerson La Verne Wittbecker, Wilmington, Del., assignor to E. I. du Pont de Nemours and Company, Wilmington, Del., a corporation of Delaware
No Drawing. Continuation-in-part of applications Ser. No. 379,358, June 30, 1964, and Ser. No. 467,091, June 25, 1965. This application June 23, 1966, Ser. No. 559,732
Int. Cl. C08g *22/06, 22/10, 53/00*
U.S. Cl. 260—75        14 Claims

ABSTRACT OF THE DISCLOSURE

Filaments of segmented elastomeric polymers based on certain hindered tertiary aralkyl diisocyanates such as α,α,α',α'-tetramethyl-p-xylylene diisocyanates and/or certain hindered tertiary aralkyl diamines such as α,α,α',α'-tetramethyl-p-xylylene diamine exhibit a unique combination of high whiteness-retention and high elastic power.

---

This application is a continuation-in-part of my copending applications Ser. No. 379,358, filed June 30, 1964, and Ser. No. 467,091, filed June 25, 1965, both now abandoned.

This invention relates to elastic filaments formed from segmented polymers. These segmented polymers are conveniently prepared from sterically hindered tertiary diisocyanates and/or diamines.

Elastic, segmented polymers prepared from polymeric glycols, aromatic diisocyanates, and various chain-extenders are well known for the formation of spandex fibers having good fiber properties, such as high elastic modulus (elastic "power"). Because of the aromatic diisocyanates conventionally used, the products have a tendency to yellow on exposure to light, acid fumes, and chlorine. Spandex fibers from aliphatic diisocyanates are known to be resistant to such yellowing, but unfortunately they have inferior elastic power as compared to the spandex fibers derived from aromatic diisocyanates. Heretofore, efforts have not been fully successful in obtaining in a single elastic polymer the highly desirable combination of both resistance to discoloration and suitable elastic power.

This invention provides elastic filaments having a unique combination of high whiteness-retention and high elastic power. This invention also provides segmented polymers having good solubility in commercial solvents, thereby permitting the preparation of solutions of high concentration for the spinning of spandex filaments.

As is well recognized in the textile industry, the term "spandex" is applied to elastic fibers in which at least 85% by weight of the fiber-forming polymeric material is a long-chain segmented polyurethane. More specifically, the polymer molecules of the segmented polyurethane may, according to the classic definition, be considered as consisting essentially of 50 to 95% by weight of recurring amorphous or so-called "soft" segments and 5 to 50% by weight of recurring so-called "hard" segments, urethane linkages serving to join the segments together in the polymer molecules. The amorphous segments are each defined as the residue remaining after removal of the terminal functional groups from an amorphous polymer having a melting point below 60° C. and a molecular weight above 600. The hard segments comprise the remainder of the polymer molecular lying between the urethane linkages and contain at least one repeating unit of a nitrogen-containing polymer which in its fiber-forming molecular weight range has a melting point above about 200° C. In a preferred embodiment of the present invention, an improved form of spandex fiber, according to this definition, is provided in that at least 12 percent by weight of the radicals comprising the hard segments in the segmented polyurethane molecules are divalent radicals of the formula:

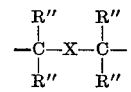

wherein said divalent radicals are each attached to NH, R'' is a lower alkyl radical selected from the class consisting of methyl, ethyl, and n-propyl, X is a radical selected from the class consisting of (a) p-phenylene,
(b) p-xylylene,
(c) 1,4-cyclohexylene,
(d) 4,4'-biphenylene,
(e) 1,4-naphthylene,
(f) 1,5-naphthylene,
(g) 2,6-naphthylene,
(h)

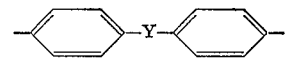

wherein —Y— is selected from the class consisting of —CH$_2$—, —CH$_2$CH$_2$—, —O—,

—S—, —SO—, and —SO$_2$—,
(i) radicals as defined in (b), (d), (e), (f), (g), and (h) hydrogenated in the ring, and
(j) radicals as defined in (a), (b), (c), (d), (e), (f), (g), (h), and (i) having substituted on the ring at least one substituent of the class consisting of methyl, methoxy, and ethyl.

The elastic fibers of the invention may be more generally described as comprising a segmented polymer consisting essentially of recurring units of the formula:

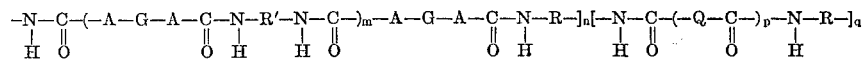

wherein

G is a long chain polymeric radical free from substituents reactive with isocyanate and having a molecular weight of at least 600;
A is selected from the class consisting of O and NH;
R' is an organic radical containing more than one carbon atom and free from substituents reactive with isocyanate;
Q is a radical obtained by the removal of one hydrogen atom from each of two functional groups of a polyfunctional compound selected from the class consisting of organic polyamines containing at least two NH$_2$ groups each attached to separate carbon atoms not part of a benzenoid ring, organic polyols containing at least two alcoholic hydroxyl groups, hydrazine, hydrazides containing at least two —NHNH$_2$ groups attached to carbonyl and piperazines containing two >NH groups or two >N—NH$_2$ groups;

R is an organic radical containing more than one carbon atom and free from substituents reactive with isocyanate, at least 80 mol percent thereof in said recurring units being divalent radicals terminating in carbon atoms which are attached to the adjacent nitrogen atoms of said recurring unit and which are not part of a benzenoid ring;

$m$ is an integer selected from the class consisting of zero and small positive integers, i.e. from 1 to about 8;

$n$ and $q$ are small positive integers, i.e. from 1 to about 8;

$p$ is an integer selected from the class consisting of zero and 1;

With the proviso that at least 33 mol percent of the sum of the radicals —Q— and —NH—R—NH— within the right-hand brackets are radicals of the formula

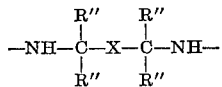

In the above formula the hard segments each can be represented by that portion as follows:

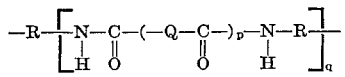

These then are connected through linkages of the formula

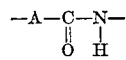

to the soft segments which comprise the radicals —G— plus any intermediate radicals. Where A is oxygen and/or where Q is derived from a polyol, fibers of the polymer can be appropriately referred to as spandex fibers. However, the invention also contemplates fibers of urea polymers, i.e. where A in the formula is NH and the radical Q terminates in N or NH.

As described above, at least 80 mol percent of the R radicals have terminal carbon atoms which are attached to the adjacent nitrogen atoms of the molecular chain of the recurring unit and which form no part of an aromatic ring. The presence of aromatic rings immediately adjacent these nitrogen atoms would substantially increase the susceptibility of the fibers to yellowing upon exposure to light, acid fumes, and chlorine such that the full advantages of this invention would not be realized. For this reason such aromatic radicals are to be either avoided completely or used in minor proportions. It will be understood that radicals containing aromatic rings but terminating in carbon atoms which form no part of the aromatic ring may be used. Thus typical radicals which R may represent are:

(1) 

(2) —alk—Ar—alk—,
(3) —cyc—,
(4) —alk—cyc—alk—,
(5) —cyc—cyc—,
(6) —alk—cyc—cyc—alk—,
(7) —cyc—alk—cyc—,
(8) —alk—cyc—alk—cyc—alk—,
(9) alkylene radicals containing from 2 to about 6 carbon atoms, wherein Ar represents a benzene ring,
alk represents an alkylene radical containing from 1 to 3 carbon atoms, and
cyc represents a cycloaliphatic ring containing from 3 to 6 carbon atoms in the ring.

As is indicated by the above, and in order to obtain fibers of satisfactory power, at least 80 mol percent of the R radicals are advantageously free of alkylene radicals containing more than 6 carbons in a straight intralinear chain, e.g. exclusive of branching. An alkylene radical in combination with one or more cyc or Ar rings should contain no more than 3 carbons in a straight intralinear chain.

The elastic filaments of this invention comprise segmented polymers which are conveniently prepared by reacting together a low-melting polyfunctional polymer, an organic polyisocyanate, and a polyfunctional active-hydrogen compound which serves as a chain-extending agent. Preferably each of these components is difunctional so that the polymer is substantially linear. However, the use of certain trifunctional and tetrafunctional components to gain some degree of cross-linking is also within the scope of the invention as will be apparent from the disclosure hereinafter.

As may be seen from the formula presented hereinabove, the segmented polymers consist of alternating first and second segments. The first segment contains the residue G which remains after removal of terminal hydroxyl or amine groups from a hydroxyl-terminated or amine-terminated polymer melting below 60° C. and having a molecular weight above 600. The second segment comprises at least one repeating unit of nitrogen-containing polymer, such as urea, urethane or bis-ureylene polymer, having a melting point above about 200° C. in its fiber-forming molecular-weight range (i.e. above 10,000). As further explained hereinafter, the segmented polymers are obtained according to conventional polymerization techniques by first reacting a difunctional polymer having a molecular weight between 600 and about 5,000 and a molar excess of a polyisocyanate component. There is thus formed an isocyanate-terminated polymer, which is thereafter chain-extended by reatcion with a compound containing more than one active hydrogen atom. The polyisocyanate component or chain-extending component or both includes at least in part one or more of certain sterically hindered tertiary compounds.

In the preparation of the segmented polymers, the difunctional polymer is preferably a polymeric glycol HO—G—OH having a molecular weight of at least 600. These polymeric glycols include the hydroxy-terminated polyethers, polyesters, copolyether-esters, polyacetals, polysiloxanes, and N-alkylated polyurethanes, all of which are well known in the art. Mixtures of these polymeric glycols may be used. From a standpoint of commercial availability, the preferred polymeric glycols for this invention are the polyether glycols, polyester glycols, and mixtures thereof.

The main group of suitable polyethers is the polyalkylene ethers, such as polyethylene glycol, polypropylene ether glycol, polytetramethylene ether glycol, polyhexamethylene ether glycol, etc. Mixtures of monomeric compounds may be used to prepare copolyethers. Some of the alkylene radicals in the polyether may be replaced by arylene or divalent cycloaliphatic radicals. The preferred polyether glycol is polytetramethylene ether glycol.

The polyester glycols may be prepared by reacting dibasic acids, esters, or acid halides with a molar excess of monomeric glycol, as is well known in the art. Suitable glycols are the polymethylene glycols, such as ethylene, trimethylene, pentamethylene, hexamethylene, decamethylene glycols; substituted polymethylene glycols, such as propylene glycol and 2-ethyl-2-methylpropanediol; and cyclis glycols, such as cyclohexanediol. These glycols may be reacted with the proper molar ratio of aliphatic, cycloaliphatic, or aromatic acids or their ester-forming derivatives to produce low-molecular-weight polymers. Suitable acids for preparing polyester and/or copolyesters include carbonic, adipic, sebacic, terephthalic, and hexahydroterephthalic acids. Mixtures of glycols and/or mixtures of acids or acid derivatives to form copolyesters may also be employed. The alkyl- and halogen-substituted derivatives of these acids may also be used. An ether-containing glycol such as triethylene glycol, may be used to produce polyetherester glycols. It will be apparent that polyester glycols derived from lactones or hydroxy acids may also be used.

Although polymeric glycols are preferred for use in the present invention, the difunctional polymer (instead of having terminal hydroxyl groups) may have $NH_2$ end groups, e.g. may be of the formula $NH_2$—G—$NH_2$, as in the amine-terminated, low-melting copolyamides, copolyurethanes, and polyhydrocarbons, e.g. diaminopolyisoprene, as taught in U.S. 3,044,989. It will be understood that the low-melting hydroxyl-terminated or amine-terminted polymers may contain some carboxyl end groups, as is known in the art. However, the proportion of these should be small in order for the segmented polymer to consist essentially of recurring units as above defined.

Polymeric glycols or diamines having the desired combination of molecular weight and low melting point may be obtained by the use of coplymers or by interrupting the polymer chain with other linking groups. For example, a urethane-interrupted polymer may be conveniently made by reacting a polymeric glycol, such as a polyether glycol or a polyester glycol, with a molar deficiency of a diisocyanate. In such cases, a conventional, unsymmetrical diisocyanate OCN—R'—NCO of the prior art, such as tolylene diisocyanate, rather than the hindered tertiary diisocyanates described herein may be used as a coupling agent. In the case where no coupling diisocyanate is used, $m$ in the formula will have a value of zero. In cases where such a diisocyanate is used, R' is derived from this diisocyanate and $m$ will have a value greater than zero. Other polyisocyanates which may furnish the R' radical include m-phenylene diisocyanate, 4,4-biphenylene dissocyanate p,p-methylenediphenyl diisocyanate, 4 - cholor - 1,3 - phenylene dissocyanate, 1,5-naphthylene diisocyanate, tetramethylene diisocyanate, hexamethylene diisocyanate, decamethylene diisocyanate, cyclohexylene diisocyanate, 4,4'-methylenedicyclohexyl diisocyanate, 1,5-tetrahydronaphthylene diisocyanate and benzene triisocanate. For the highest degree of whiteness retention in the products of this invention, it is preferred that the coupling diisocyanate, if any, be free of NCO groups attached to an aromatic nucleus. The hindered tertiary diisocyanates described in greater detail hereinafter may also be used as coupling agents.

The polymeric glycol or diamine is provided with terminal isocyanate groups by a "capping" reaction with a stoichiometric excess of a polyisocyanate component R(NCO)$_y$, wherein $y$ is 2 to 4, which preferably includes at least in part one or more of certain sterically hindered tertiary diisocyanates. As indicated hereinbefore, at least 80 mol percent of the radicals R derived from the "capping" diisocyanate must be of specified types. These include, in addition to the hindered tertiary radicals described later, various combinations of alkylene and cycloaliphatic radicals in which the alkylene residue does not contain more than 6 carbon atoms. These radicals may contain one or more halogens or alkyl substituents, and they may contain in the chain hetero atoms or groups free of active hydrogen, e.g., —O—, —S—,

ester, carbonate, urethane, and amide. Any aromatic rings present are not attached directly to the isocyanate groups. Up to 20 mol percent of the "capping" diisocyanate may be diisocyanate which does not fall within the above-specified classes.

The advantages of the invention are attained by use of hindered tertiary radicals. Ordinarily, the hindered radicals are derived from the diisocyanate. When a diamine chain-extender is used, the requirements are satisfied if the diamine chain-extender alone is of the sterically hindered tertiary type. In such a case the capping diisocyanate may be unhindered. Alternatively, the hindered radicals may be distributed between the diisocyanate and the diamine in any proportion desired, provided that at least one-third of the total diisocyanate and diamine be of the hindered tertiary type specified herein. Of course, if more than one-third of this total are radicals of the sterically hindered tertiary type, superior products will be obtained. If the chain-extender is not a diamine, then at least 50 mol percent of the "capping" diisocyanate must be of the sterically hindered tertiary type.

The sterically hindered tertiary diisocyanates have the following structural formula:

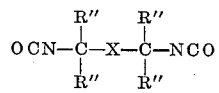

wherein R" is methyl, ethyl, or n-propyl and X has the significance recited hereinabove. Diisocyanates of this type are disclosed in U.S. Patent 2,723,265 and in French Patent 1,299,557. It will be understood that in the above formulas the R" groups may be the same or different; however, for the best fiber properties it is preferred that they be alike. Examples of suitable sterically hindered tertiary diisocyanates are α,α,α',α'-tetramethyl-p-xylene diisocyanate, α,α-dimethyl, α',α'-diethyl-p-xylylene diisocyanate α,α,α',α' - tetrapropyl - p-xylylene diisocyanate. Specific examples of still other sterically hindered tertiary diisocyanates within the above formula that may be employed are summarized in the following table:

| R''' groups | X radical | Y radical |
|---|---|---|
| Each methyl | p-Phenylene | |
| Do | 1,4-cyclohexylene | |
| Do | 4,4'-biphenylene | |
| Do | 1,4-naphthylene | |
| Do | 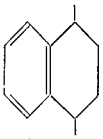 | |
| Do | 1,5-naphthylene | |
| Do | 2,6-naphthylene | |
| Do | 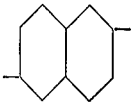 | |
| Do | 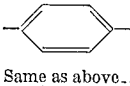—Y—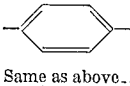 | —$CH_2$— |
| Do | Same as above | —$CH_2$—$CH_2$— |
| Do | do | —O— |
| Do | do | $\begin{matrix} CH_3 \\ -C- \\ CH_3 \end{matrix}$ |
| Do | do | —S— |
| Do | do | —S O— |
| Do | do | —S $O_2$— |
| Do | 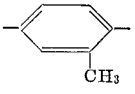 | |
| Do | 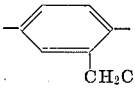 | |
| Do | 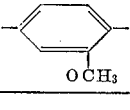 | |

As indicated by the above formula of the diisocyanates, the relative position of the sterically hindered isocyanate groups is essential for improved fiber properties. For example, the tetramethyl-m-xylylene diisocyanate gives a fiber of markedly inferior properties as compared to a fiber produced from the corresponding para isomer.

Specific examples of diisocyanates other than the hindered tertiary diisocyanates suitable for constituting at least 80 percent of the total "capping" polyisocyanate component are p,p'-phenylenediethyl diisocyanate (p-bis-isocyanatoethylbenzene), m-xylylene diisocyanate, hexahydro-m-xylylene diisocyanate, hexahydro-p-xylylene diisocyanate, 1,3 - cyclohexylene diisocyanate, 1,2 - cyclobutylenedimethyl diisocyanate, 1,4 - cyclohexylene diisocyanate, 3,3'- and 4,4' - dicyclohexylene diisocyanates, 4,4' - methylenedicyclohexyl diisocyanate, 4,4' - bis(isocyanatomethyl)bicyclohexyl, 4,4' - bis(isocyanatomethylcyclohexyl)methane, tetramethylene diisocyanate, pentamethylene diisocyanate, and hexamethylene diisocyanate.

Mixtures of diisocyanates within the formula for sterically hindered diisocyanates given above may be used. This will give rise to products wherein the X groups and/or R'' groups in the formula of the polymer molecule may differ. It is preferred that the X groups be all alike and that the R'' groups be all alike. Moreover, as indicated hereinbefore, not all of the diisocyanate used for the "capping" reaction need be of the sterically hindered tertiary class. All the polyisocyanates which are useful in coupling, as illustrated above in connection with the definition of the radical R'' can be used for capping, subject to the limitations specified. Of course, as greater proportions of the extraneous polyisocyanates are used, the improvement in whiteness-retention and elastic power of the filamentary products is lessened.

Where the capping reaction involves the reaction of the polyisocyanates with a polymeric glycol, a catalyst is useful to sorten the reaction time but not essential in carrying out this reaction. Conventional catalysts which accelerate the reaction of isocyanate and hydroxyl groups include tertiary amines, such as triethylene diamine, and various organometallic compounds, such as dibutyltin dilaurate. Mixtures of polymeric glycols may be used, thereby giving rise to a product in which the G groups in the formula will be different.

The isocyanate-terminated polymer is reacted with a chain-extender for preparation of the segmented polymer. The principal classes of suitable chain-extenders are (a) the non-aryl organic diamines, such as ethylene diamine, bis-(4-aminocyclohexyl)methane, m-xylylenediamine; (b) hydrazine; (c) dihydrazides, such as carbohydrazide and the dihydrazides of oxalic and adipic acids; (d) organic glycols, such as ethylene glycol, tetramethylene glycol, and 1,4-bis(hydroxymethyl)cyclohexane; (e) water; and (f) piperazines, such as piperazine, 2,5-dimethylpiperazine and 1,4-diaminopiperazine. The organic diamines, dihydrazides, and glycols may contain heteroatoms and other functional groups which are less reactive with NCO than hydroxyl. When water is used as chain-extender, p in the formula is zero; otherwise, p has a value of 1. Preferably, the chain-extender is chosen such that in a separate reaction with the polyisocyanate used in the capping reaction it will produce a nitrogen-containing polymer having a melting point above about 200° C. in its fiber-forming molecular-weight range. The preferred segmented polymers will have recurring units which contain from about 50% to about 95% by weight of soft segments and 5 to 50% by weight of hard segments as above defined.

The preferred chain-extenders for the present invention are the organic diamines. Useful sterically hindered diamines are organic diamines of the formula

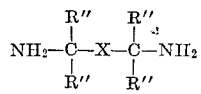

for example, α, α, α', α'-tetramethyl-p-xylylenediamine or other diamines corresponding to the above mentioned sterically hindered tertiary diisocyanates. A plurality of chain-extenders may be used. In such cases, the compounds may be reacted with the isocyanate-terminated polymer as a mixture, or the chain-extenders may be reacted sequentially in any order, as desired. The Q groups in the formula may differ when more than one chain-extender is employed.

It should be apparent that the length of the segment containing the chain-extender may be regulated by adding additional amounts of monomeric diisocyanate together with the chain-extender during the chain-extension reaction. When no unreacted monomeric diisocyanate is present during the chain-extension, the length of this segment will be at a minimum, and q in the formula will be 1. When the chain-extender is an organic diamine, no catalyst need be present during the chain-extension reaction. If the chain-extender is water or an organic glycol, catalysts of the aforementioned types may be used to shorten the reaction time. If a catalyst has been used for the capping reaction, no additional quantity is generally necessary for the chain-extension reaction. In order to obtain the desired molecular weight of the segmented polymer, a small amount of a chain-terminator, e.g. diethylamine, may also be included in the chain-extension reaction, as is well known to those skilled in the art.

The segmented polymers of this invention may be prepared by known polymerization techniques. They are preferably made by solution polymerization, which involves dissolving the reactants, i.e. the isocyanate-terminated polymer and chain-extender, in separate portions of a suitable solvent which also serves as a solvent for the resulting segmented polymer. The two solutions are then mixed and stirred for a period of time ranging from a few minutes up to several hours at a temperature between about 0° and about 100° C. During this time the viscosity increases and the polymer may be separated and purified according to known methods. Suitable solvents for the polymerization reaction include N,N-dimethylformamide, N,N-dimethylacetamide, N-methylpyrrolidone, hexamethylphosphoramide, dimethylsulfoxide, and tetramethylene sulfone. Alternatively the polymers of this invention may be prepared by other polymerization techniques, as described in Frankenburg et al. U.S. 2,957,852. For example, the segmented polymers of this invention may be prepared from diamines and bischloroformates of glycols. In such cases, the hindered tertiary radicals described herein would be obtained from the diamines.

One advantage of preparing the polymers in a solvent is that the solution may be used directly for the spinning of elastic filaments. The filaments may be obtained by conventional procedures, including dry-spinning and wet-spinning. Shaping and polymerization may also be combined into a single step by the process described in Koller U.S. Re. 24,689 and generally known as chemical-spinning. The properties of the filaments may be improved by a cold-drawing operation, for example, at draw ratios from about 2× to about 10×.

The segmented polymers most useful for elastic-filament applications are those having an inherent viscosity above 0.5. Inherent viscosity refers to the value of the expression $$\frac{ln\left(\frac{\eta}{\eta_0}\right)}{c}$$

in which $\eta$ is the viscosity of a dilute solution of the polymer at 25° C., $\eta_0$ is the viscosity of the solvent (hexamethylphosphoramide) in the same units and at the same temperature, and $c$ is 0.5, the concentration in grams of the polymer per 100 ml. of solution.

The elastic filaments of this invention are composed of segmented polymers which may have a substantially linear polymeric structure, or they may be cross-linked to some extent. The term "substantially linear" is not intended to exclude polymers which have branches extending out from the main polymer chain. Cross-linked products may be obtained by using reactants with a functionality of more than two, but this is generally less satisfactory since an excessive degree of cross-linking interferes with the shaping of the filaments. Cross-linked filaments may be prepared directly by the process of chemical spinning using reactants having a functionality of more than two, e.g. by the process disclosed in the aforementioned Koller reissue patent. Alternatively, the substantially linear filaments may be cross-linked by conventional methods after shaping, such as by heating with an excess of organic diisocyanate. Typical reactants that may, for example, be used as a part of all of the chain-extended to provide some degree of cross-linking, include diethylene triamine, trimethylol propane and glycerine. The preferred products of the invention will have no more than one cross-link for each 2,000 molecular weight portion of the polymer chain in order to achieve the benefits of this invention.

Among the numerous modifications which are possible, it will be apparent that the elastic fibers of the invention can be provided to contain common additives such as dyes, pigments, antioxidants, delusterants, antistatic agents, U.V. stabilizers and the like by inclusion of such with the polymer prior to fiber formation or be incorporated by other suitable treatments. It will be further understood that although the filament-forming component of the elastic fibers should preferably consist essentially of polymers having recurring units as defined by the formulas above, nevertheless the invention contemplates the use of polymer mixtures which include, in part, other conventional polymers.

This invention will be further illustrated, but is not intended to be limited, by the following examples in which parts and percentages are by weight unless otherwise specified. The terms $P_{100}$ and $P_{200}$ refer to the fifth-cycle, unload values of stress ("power") at the elongations indicated by the respective subscripts, after cycling as follows: yarn is cycled five times between zero and 300% extension at a constant rate of elongation, i.e., 800% per minute. The sample is held at the maximum extension for one half-minute after the fifth extension to permit stress decay. Stress, on unloading from this last extension, is measured and is expressed in terms of grams per denier at the elongation indicated by the respective subscript. At the end of the fifth cycle, the length of the yarn is measured after being allowed to recover for one-half minute, and is used in the determination of "set" described hereinafter. The length of yarn is measured between two marks placed on the yarn before testing. This technique is used to avoid error caused by slippage of the yarn sample in the clamps of the testing instrument.

The term "set" refers to the increase in length of the sample as a result of the 5-cycle test described above and is expressed as percent of original length. The terms "elongation" and "tenacity" refer, respectively, to the percent elongation at break and the stress measured in grams at the break, this stress being divided by the initial fiber denier before cycling.

The degree of yellowness, referred to in the examples as $b$ value, is determined from colorimetric data obtained by analyzing continuous filament samples in aggregates which are about three inches square. The reflectance ratios of the samples in the green and blue filter settings of a colorimeter are measured, using a Model IV Color Master Differential Colorimeter, manufactured by Manufacturers Engineering and Equipment Corporation, Hatboro, Pa., and calibrated against the manufacturer's standard reference plates and the National Bureau of Standards' certified reflectance plates. Three readings are taken on each of the samples, one of the measurements for the filament samples being made with the sample rotated 90° from the position of the first reading. The $b$ values are then calculated from the average of three readings, using the following formula $$b = 42.34(G^{1/2} - B^{1/2})$$

where G represents the reflective ratio with the green filter and B represents the reflectance ratio with the blue filter.

The test for smog discoloration is performed by wrapping samples of continuous filaments on a metal frame and exposing them to a synthetic atmosphere containing air; nitrogen dioxide, sulfur dioxide, and 2-pentene for four hours, during which exposure the samples are irradiated by a combination of ultraviolet and visible light. The samples are measured for color, both before and after exposure.

The test for chlorine discoloration is performed by wrapping the filaments on a block of polytetrafluoroethylene, measuring the samples for color, and then immersing them for five 45-minute periods in an aquous solution containing 150 parts per million of active chlorine at 70° C. The samples are rinsed with cold water, dried thoroughly, and again measured for color.

The test for ultraviolet discoloration is performed by exposing the samples wrapped on cards to the rays of a xenon arc for 24 hours. The light source is an "Osram" 6–kw., high pressure, quartz-shielded, water-cooled, AC lamp, purchased from Macbeth Corporation of Newburgh, N.Y. The temperature of exposure averages 65° C. Samples are measured for color, both before and after exposure.

EXAMPLE 1

A mixture of 215.7 parts of polytetramethyleneether glycol having a molecular weight of about 2,000 and 51.30 parts of $a,a,a',a'$-tetramethyl-p-xylylene diisocyanate is heated with stirring at about 80° C., until it becomes homogeneous. The mixture is cooled to 55° C., and 0.06 part of dibutyltin dilaurate is added. The mixture is then heated for 40 minutes at 90° C., to yield an isocyanate-terminated polyether which contains 3.49% NCO. A solution is formed by dissolving 112.8 parts of the isocynate-terminated polyether in 418 parts of dry N,N-dimethylacetamide. To this solution is added with stirring at ambient temperature 57 parts of a solution obtained by dissolving 8.17 parts of 1,3-diaminocyclohexane (70/30 ratio of cis/trans isomers) in 85.75 parts of dimethylacetamide. The viscous solution of segmented polymer obtained contains 20% solids. The segmented polmer has an inherent viscosity of 1.51.

To the viscous solution of segmented polymer is added 1.2 parts of 2,4,6-tris(3,5-di-t-butyl-4-hydroxybenzyl)-mesitylene ("Ionox" 330). This solution is dry-spun in the usual way to produce elastic filaments. The filaments are boiled off in a relaxed condition for one hour and are allowed to dry at room temperature. The filaments possess the following physical properties; denier—72; tenacity—.93 g.p.d.; elongation—650%; set—12%; $P_{100}$—.042 g.p.d.; $P_{200}$—.085 g.p.d.; stress decay—18%.

The filaments are nearly colorless and show unusually good whiteness retention on exposure to smog and chlorine, as indicated by the following data:

| | "b" values | | |
|---|---|---|---|
| | As Prepared | After Exposure | Δb |
| Smog discoloration | 1.7 | 4.9 | 3.2 |
| Chlorine discoloration | 1.8 | 2.6 | 0.8 |

EXAMPLE 2

A solution is prepared by dissolving 108.4 parts of the isocyanate-terminated polyether prepared as described in example 1, in 381 parts of dimethylacetamide. To this solution is added with stirring at ambient temperature 55 parts of a solution prepared by dissolving 9.90 parts m-xylylene-diamine in 84.14 parts of dimethylacetamide. The viscous solution so obtained contains 21% solids. The segmented polymer has an inherent viscosity of 1.58.

To the viscous solution thus prepared is added 1.2 parts of "Ionox" 330, and the solution is dry-spun in the usual way to produce elastic filaments which possess the following properties after boil-off: denier—81; tenacity—.95 g.p.d.; elongation—640%; set—14%; $P_{100}$—.040 g.p.d.; $P_{200}$—0.77 g.p.d.; stress decay—18%.

The elastic filaments show good whiteness retention in the tests for smog, chlorine, and ultraviolet discoloration, as indicated by the following data:

|  | "b" values | | |
| --- | --- | --- | --- |
|  | As Prepared | After Exposure | $\Delta$b |
| Smog discoloration | 1.4 | 6.6 | 5.2 |
| Chlorine discoloration | 1.1 | 1.5 | 0.4 |
| Ultraviolet discoloration | 4.4 | 8.9 | 4.5 |

For comparison, a similar segmented polymer is prepared in which equivalent amounts of a conventional diisocyanate, p,p'-methylenediphenyl diisocyanate, is used in the polymer preparation in place of $a,a,a',a'$-tetramethyl-p-xylylene diisocyanate. All other ingredients and conditions are kept unchanged in the preparation. With the conventional polymer the discoloration data are as follows:

|  | "b" values | | |
| --- | --- | --- | --- |
|  | As Prepared | After Exposure | $\Delta$b |
| Smog discoloration | 0.7 | 10.2 | 9.5 |
| Chlorine discoloration | 2.0 | 13.1 | 11.1 |
| Ultraviolet discoloration | 2.8 | 15.2 | 12.4 |

EXAMPLE 3

A mixture of 1020 parts of ethylene glycol, 1270 parts of trimethylene glycol and 2,000 parts of adipic acid is heated under nitrogen for 4 hours at 180–185° C., at atmospheric pressure and then for 4 hours at 210–220° C., under vacuum. There is obtained a copolyester melting below room temperature and having a molecular weight of approximately 2400.

A mixture of 125.0 parts of the above-described copolyester and 25.50 parts of $a,a,a',a'$-tetramethyl-p-xylylene diisocyanate is stirred and heated at 80° C., until homogenous. The mixture is cooled to 65° C., and 0.02 part dibutyltin dilaurate is added. The mixture is then heated for 40 minutes at 90° C., to produce an isocyanate-terminated copolyester which contains 2.58% NCO. A solution is prepared by dissolving 145.7 parts in 400 parts of dimethylacetamide. To this solution is then added with stirring at ambient temperature 57.5 parts of a solution prepared by dissolving 21.40 parts of 1,3-diaminocyclohexane (70/30 ratio of cis/trans isomers) in 213.6 parts of dimethylacetamide. The viscous solution of segmented polymer obtained contains 25% solids and has a viscosity of 70 poises. To this solution is added 2.0 parts of isocyanate-terminated copolyester prepared by reacting 2 mols of 4.4'-methylenedicyclohexyl diisocyanate (containing 26% of trans/trans isomer) with one mol of the copolyester described in the first paragraph of this example. At this point the solution contains a small amount of unreacted NCO groups. A solution of 1,3-diaminocyclohexane is slowly added until the solution of segmented polymer remains permanently basic to bromphenol blue indicator. At this point the solution of segmented polymer has a viscosity of 230 poises.

To this solution is then added a slurry of titanium dioxide in a solution of the segmented elastomer of Example 1 in dimethylacetamide, and a solution of 2-(2'-hydroxy-3'-t-butyl-5'-methylphenyl)-5-chloro - benzotriazole and "Ionox" 330 in dimethylacetamide such that the final mixture contains 5.3%, 0.5%, and 1.1% respectively of each additive, based on the solids of segmented polymer of the preceding paragraph. The viscous solution of segmented polymer containing these additives is dry-spun the usual way to produce filaments of good elasticity.

EXAMPLE 4

A solution of segmented elastomer is prepared as described in Example 1 except that no "Ionox" 330 is added. In this preparation the segmented polymer has an inherent viscosity of 1.22. It is dry-spun in the usual way to produce elastic filaments having the following physical properties after boil-off: denier—78; tenacity—.70 g.p.d.; elongation—577%; set—10%; $P_{100}$—.036 g.p.d.; $P_{200}$—.072 g.p.d.; stress decay—21%.

On exposure to smog and chlorine the following results are obtained:

|  | "b" values | | |
| --- | --- | --- | --- |
|  | As Prepared | After Exposure | $\Delta$b |
| Smog discoloration | 2.0 | 3.7 | 1.7 |
| Chlorine discoloration | 3.2 | 0.3 | −2.9 |

EXAMPLE 5

A solution is prepared by dissolving 126.9 parts of an isocyanate-terminated polyether containing 3.35% NCO, prepared as described in Example 1, in 463 parts of dimethylacetamide. To this solution is added with stirring at ambient temperature 65 parts of a solution prepared by dissolving 5.55 parts of trimethylenediamine in 86.8 parts of dimethylacetamide. The viscous solution so obtained contains 20% solids. The segmented polymer has an inherent viscosity of 1.35.

To the viscous solution thus prepared is added 21 parts of a slurry prepared from 29.2 parts dimethylacetamide, 30.5 parts titanium dioxide, 6.5 parts "Ionox" 330, 0.08 part ultramarine blue pigment, 18.3 parts poly(N,N-diethylaminoethyl methacrylate), and 3.22 parts 2-(2'-hydroxy - 3' - t - butyl-5'-methylphenyl)-5-chlorobenzotriazole. The solution is dry-spun in the usual way to produce elastic filaments which possess the following properties after boil-off: denier 71; tenacity 0.52 g.p.d.; elongation 542%; set 15.6%; $P_{100}$ .036 g.p.d.; $P_{200}$ .080 g.p.d.; stress decay 18%.

EXAMPLE 6

A mixture of 354 parts of polytetramethylene-ether glycol having a molecular weight of about 2000 and 80.0 parts of $\alpha,\alpha,\alpha',\alpha'$-tetramethyl - p - xylene diisocyanate is reacted as described in Example 1 to give an isocyanate-terminated polyether containing 2.86% NCO. A solution is formed by dissolving 376 parts of the isocyanate-terminated polyether in 1205 parts of dimethylacetamide. To this solution is added with stirring at ambient temperature 167 parts of a solution prepared by dissolving 22.8 parts of tetramethylenediamine in 303 parts dimethylacetamide. The viscous solution so obtained contains 22% solids. The segmented polymer has an inherent viscosity of 1.19.

To the viscous solution thus prepared is added 62.5 parts of the slurry described in Example 5. The mixture is dry-spun in the usual way to produce elastic filaments which possess the following properties after boil-off: denier, 84; tenacity, .63 g.p.d.; elongation, 661%; set, 13%; $P_{100}$, .031 g.p.d.; $P_{200}$, .063 g.p.d.; stress decay, 18.4%.

EXAMPLE 7

A mixture of 148 parts of polytetramethylene-ether glycol having a molecular weight of 964, 850 parts of polytetramethylene-ether glycol having a molecular weight of 1556, and 256 parts of α,α,α',α'-tetramethyl-p-xylene diisocyanate is heated with stirring at about 80° C. until the mixture becomes homogeneous. The mixture is cooled to 55° C. and about 0.02 part of dibutyltin dilaurate is added. The mixture is heated for 60 minutes at 70–80° C. and yields an isocyanate-terminated polyether containing 2.07% NCO. To a solution of 600 parts of the isocyanate-terminated polyether dissolved in 1900 parts of dimethylacetamide is added with stirring at ambient temperature 110 parts of a solution obtained by dissolving 40.0 parts of 1,3-diaminocyclohexane (70/30 ratio of cis-trans isomers) in 250 parts of dimethylacetamide. The inherent viscosity of the polymer is 1.60.

To the viscous polymer solution is added 90.0 parts of the slurry described in Example 5. The mixture is heated to 82° C. and then dry-spun, yielding elastic filaments which, after boil-off for one hour in a relaxed condition and drying at room temperature, possess the following properties: Denier, 70; tenacity, .45 g.p.d.; elongation, 549%; set, 12%; $p_{100}$, .039 g.p.d.; $P_{200}$, .087 g.p.d.; stress decay, 17%.

EXAMPLE 8

A mixture of 226 parts of poltetramethylene ether glycol having a molecular weight of about 2050 and 53.7 parts of α,α,α',α'-tetramethyl-p-xylene diisocyanate is heated with stirring at about 80° C. until homogeneous. The mixture is cooled to 55° C. and about 0.02 part dibutyltin dilaurate is added. The mixture is then heated for 60 minutes at 70–80° C. to yield an isocyanate-terminated polyether which contains 3.57% NCO. To a solution of 125 parts of the isocyanate-terminated polyether dissolved in 443 parts of dimethylacetamide there is added with stirring at ambient temperature 46.5 parts of a solution obtained by dissolving 9.7 parts of 1,3-diaminocyclohexane (70/30 ratio of cis/trans isomer) and 1.1 parts of 1,3-diaminopropane in 100 parts of dimethylacetamide. The segmented polymer has an inherent viscosity of 1.50. To this solution is added 21.6 parts of the slurry described in Example 5. The mixture is dry-spun, yielding elastic filaments which, after boil-off and drying as in Example 7, possess the following physical properties: tenacity, 0.86 g.p.d.; elongation, 618%; set, 12%; $P_{100}$, .039 g.p.d.; $P_{200}$, .081 g.p.d.; stress decay, 20%.

EXAMPLES 9–41

In the following examples, segmented polymers are prepared by carrying out the polymerization reactions in hexamethylphosphoramide or in dimethylacetamide under conditions similar to those used in the preceding examples. The respective polymeric glycols, diisocyanates, and chain-extenders used are indicated in the following table.

| Example Number | Polymeric Glycol | Diisocyanate | Chain-Extender |
| --- | --- | --- | --- |
| 9 | Polytetramethylene ether glycol (2,000 M.W.). | α,α,α',α'-Tetramethyl-p-xylylene | Hydrazine. |
| 10 | do | do | Piperazone. |
| 11 | do | do | Thiobisethylamine. |
| 12 | do | do | p-xylyleneglycol. |
| 13 | do | do | Water. |
| 14 | do | do | Carbohydrazide. |
| 15 | do | do | 1,4-diaminopiperazine. |
| 16 | do | p-Xylylene | α,α,α',α'-Tetramethyl-p-xylylenediamine. |
| 17 | do | 2,5-diisopropyl-p-xylylene | Do. |
| 18 | do | 4,4'-methylenedicyclohexyl | Do. |
| 19 | do | 1,4-cyclohexylene | Do. |
| 20 | do | 4,4'-methylenedicyclohexyl | α,α,α',α'-Tetramethylhexahydro-p-xylylenediamine. |
| 21 | do | 1,4-cyclohexylene | Do. |
| 22 | do | α,α,α',α',-Tetramethhl-p-xylylene/p-xylylene (50/50) | α,α,α',α'-Tetramethyl-p-xylylene-diamine. |
| 23 | do | α,α,α',α'-Tetraethyl-p-xylylene | 1,3-cyclohexylenediamine. |
| 24 | do | do | m-Xylylenediamine. |
| 25 | do | do | Ethylenediamine. |
| 26 | do | α,α'-Dimethyl-α,α'-diethyl-p-xylylene | 1,3-cyclohexylenediamine. |
| 27 | do | do | m-Xylylenediamine. |
| 28 | do | do | Ethylenediamine. |
| 29 | do | $CH_3$—C(CH_3)—CH$_2$—⟨⟩—CH$_2$—C(CH$_3$)—CH$_3$ | 1,3-cyclohexylenediamine. |
| 30 | do | Same as above | Ethylenediamine. |
| 31 | do | do | m-Xylylenediamine. |
| 32 | do | $CH_3$—C(CH$_3$)—⟨⟩—⟨⟩—C(CH$_3$)—CH$_3$ | 1,3-cyclohexylenediamine. |
| 33 | do | Same as above | 4,4'-methylenedicyclohexyldiamine. |
| 34 | do | $CH_3$—C(CH$_3$)—⟨⟩—CH$_2$—CH$_2$—⟨⟩—C(CH$_3$)—CH$_3$ | 1,3-cyclohexylenediamine. |
| 35 | do | Same as above | p-Xylylenediamine. |
| 36 | do | do | 1,3-diaminoadamantane. |
| 37 | do | α,α,α',α'-Tetramethyl-p-xylylene/p-xylylene (75/25) | 1,3-cyclohexylenediamine. |
| 38 | do | do | m-Xylylenediamine. |
| 39 | do | α,α,α',α'-Tetramethyl-p-xylylene/p,p'-methylene-diphenyl (90/10). | 1,3-cyclohexylenediamine. |
| 40 | do | do | m-Xylylenediamine. |
| 41 | Polyesterurethane glycol from 3 mols of polycaprolactone (740 M.W.) and 2 mols of tolylene diisocyanate. | α,α,α',α'-Tetramethyl-p-xylylene | 1,3-cyclohexylenediamine. |

The polymer solutions from Examples 9 through 41 can be spun to yield strong, nondiscoloring, elastic filaments. Filament properties are easily approximated by casting films from the polymer solutions, which are then thoroughly dried and cut into thin strips. The respective samples have the following physical properties:

| Example Number | Stress Decay percent | Set percent | $P_{100}$ (g.p.d.) | $P_{200}$ (g.p.d.) | Tenacity (g.p.d.) | Elongation percent |
|---|---|---|---|---|---|---|
| 9 | 17 | 23 | 0.034 | 0.068 | 0.43 | 609 |
| 10 | 18 | 26 | 0.030 | 0.068 | 0.32 | 540 |
| 11 | 17 | 20 | 0.026 | 0.058 | 0.44 | 652 |
| 12 | 17 | 58 | 0.007 | 0.029 | 0.10 | 706 |
| 13 | 19 | 22 | 0.032 | 0.069 | 0.36 | 495 |
| 14 | 22 | 11 | 0.022 | 0.047 | 0.25 | 534 |
| 15 | 16 | 13 | 0.021 | 0.044 | 0.45 | 663 |
| 16 | 18 | 13 | 0.028 | 0.053 | 0.53 | 692 |
| 17 | 17 | 12 | 0.035 | 0.067 | 0.41 | 546 |
| 18 | 22 | 19 | 0.031 | 0.072 | 0.59 | 572 |
| 19 | 18 | 10 | 0.034 | 0.060 | 0.55 | 589 |
| 20 | 24 | 18 | 0.026 | 0.051 | 0.67 | 601 |
| 21 | 20 | 16 | 0.026 | 0.048 | 0.53 | 609 |
| 22 | 17 | 18 | 0.030 | 0.060 | 0.37 | 580 |
| 23 | 18 | 11 | 0.035 | 0.065 | 0.59 | 616 |
| 24 | 20 | 13 | 0.030 | 0.062 | 0.36 | 546 |
| 25 | 16 | 11 | 0.035 | 0.065 | 0.45 | 593 |
| 26 | 18 | 12 | 0.029 | 0.060 | 0.50 | 600 |
| 27 | 17 | 12 | 0.030 | 0.060 | 0.38 | 579 |
| 28 | 17 | 12 | 0.032 | 0.059 | 0.35 | 578 |
| 29 | 13 | 8 | 0.032 | 0.053 | 0.44 | 652 |
| 30 | 15 | 12 | 0.036 | 0.059 | 0.52 | 662 |
| 31 | 11 | 8 | 0.025 | 0.047 | 0.28 | 652 |
| 32 | 18 | 19 | 0.022 | 0.048 | 0.46 | 729 |
| 33 | 20 | 23 | 0.024 | 0.055 | 0.47 | 648 |
| 34 | 18 | 31 | 0.020 | 0.054 | 0.25 | 586 |
| 35 | 19 | 32 | 0.024 | 0.062 | 0.31 | 580 |
| 36 | 18 | 20 | 0.023 | 0.050 | 0.39 | 640 |
| 37 | 15 | 13 | 0.036 | 0.065 | 0.43 | 569 |
| 38 | 17 | 15 | 0.033 | 0.062 | 0.44 | 609 |
| 39 | 19 | 13 | 0.030 | 0.056 | 0.44 | 592 |
| 40 | 18 | 18 | 0.027 | 0.051 | 0.48 | 673 |
| 41 | 16 | 15 | 0.024 | 0.058 | 0.54 | 647 |

Monomer preparation (A) The diisocyanate of Examples 26 to 28 is prepared as follows: One mole of p-diasetylbenzene is reacted with two moles of ethylmagnesium bromide by a standard Grignard reaction to yield the ditertiary alcohol which corresponds to the desired diisocyanate. The latter alcohol is then converted to the corresponding dibromide with HBr. The dibromide is finally reacted with silver cyanate to give the indicated diisocyanate.

(B) The diisocyanate of Examples 23 to 25 is prepared as follows: One mole of dimethyl terephthalate is reacted with four moles of ethylmagnesium bromide by a standard Grignard reaction to yield the ditertiary alcohol which corresponds to the desired diisocyanate. Conversion of the alcohol to the dibromide and then to the final diisocyanate is effected as in (A), above.

(C) The diisocyanate of Examples 32 and 33 is prepared as follows: The diolefin compound p,p'-diisopropenylbiphenyl is reacted with HCl in diethyl ether medium to give the dichloride which corresponds to the desired diisocyanate. The dichloride derivative is reacted with silver cyanate to give the indicated diisocyanate.

(D) The diisocyanate of Examples 34 to 36 is prepared as follows: The dichloride compound corresponding to the desired diisocyanate is reacted with silver cyanate as in (A), above.

(E) The diisocyanate of Example 43 is prepared as follows: One mole of dimethyl 2,6-naphthalenedicarboxylate is reacted with four moles of methylmagnesium bromide by a standard Grignard reaction to yield the ditertiary alcohol which corresponds to the desired diisocyanate. Conversion of the alcohol to the dibromide and then to the final diisocyanate is effected as in (A), above.

EXAMPLE 42

This example illustrates the preparation of a partially crosslinked product. A homogeneous solution is prepared by stirring together at room temperature 18.7 parts of an isocyanate-terminated polyether containing 3.18% NCO, prepared as described in Example 1, 0.481 part of pentaerythritol, and 15 parts of hexamethylphosphoramide. To this mixture is added 0.1 part of dibutyltin dilaurate, and the viscous solution is cast into a film on a glass plate. The film is placed in an oven at 70–80° C. for 24 hours, yielding an elastic polymer which is insoluble in hexamethylphosphoramide and in dimethylacetamide, indicating that the film is crosslinked. After 72 additional hours at 70° C., the film is boiled-off for 1 hour in relaxed condition. It is then dried at room temperature and cut into thin strips, which have the following properties: tenacity—0.09 g.p.d.; elongation—477%; $P_{100}$—.015 g.p.d.; $P_{200}$—.041 g.p.d.; stress decay—15%; set—22%. Elastic crosslinked fibers of comparable properties can be produced by wet- or dry-spinning the polymer composition immediately after addition of the tin catalyst and before substantial gelation has occurred.

EXAMPLE 43

A mixture of 103.7 parts of polytetramethylene ether glycol having a molecular weight of about 2073 and 29.4 parts of 2,6-bis-(1-isocyanato-1-methylethyl)naphthalene is heated with stirring under dry nitrogen to 70° C. until it becomes homogeneous and 0.06 part of dibutyl tin dilaurate is added. The temperature of the stirred solution is maintained at 75° C. for 45 minutes to yield an isocyanate-terminated polyether which contains 2.98% NCO. A solution is formed by dissolving 15.7 parts of the isocyanate-terminated polyether in 60.4 parts of hexamethylphosphoramide. To this solution is added slowly with stirring at ambient temperature 5.6 parts of a solution prepared by dissolving 11.4 parts of 1,3-diaminocyclohexane (70/30 ratio of cis/trans isomers) in 100 parts of hexamethylphosphoramide. The addition of small amounts of diethylamine is used to regulate the viscosity of the polymer. The polymer solution obtained contains 20% solids. The segmented polymer has an inherent viscosity of 2.34. The polymer solution can be spun to yield strong non-discoloring elastic filaments. The filament properties are approximated by casting a film from the polymer solution, which is then thoroughly dried and cut into thin strips, which have the following properties: tenacity—0.49 g.p.d.; elongation—584%; $P_{100}$—0.035 g.p.d.; $P_{200}$—0.064 g.p.d.; stress decay—17%; set—10%.

As may be seen from the examples, the elastic filaments of this invention have a combination of excellent whiteness retention and good physical properties. The presence of the four R″ groups in the structure of the segmented polymers is a critical factor in achieving the high power for the elastic filaments. The four R″ groups also contribute to good solubility, thereby facilitating solution spinning of the filaments. The elastic filaments of this invention, particularly in the bare or uncovered state, are useful in the manufacture of elastic fabrics of all types.

Since many different embodiments of the invention may be made without departing from the spirit and scope thereof, it is to be understood that the invention is not to be limited except to the extent defined in the following claims.

What is claimed is:

1. In a spandex fiber in which at least 85% by weight of the fiber-forming polymeric material is a long-chain segmented polyurethane wherein the polymer molecules consist essentially of 50 to 95% by weight of recurring soft segments and 5 to 50% by weight of recurring hard segments, said soft and hard segments being joined together through urethane linkages, said soft segments being the residue remaining after removal of the terminal functional groups from an amorphous hydroxyl-terminated polymer having a melting point below 60° C. and a molecular weight above 600, said hard segments comprising the remainder of the polymer molecules lying between the urethane linkages and containing at least one repeating unit of a nitrogen-containing polymer which in its fiber-forming molecular weight range has a melting point above about 200° C.; the improvement wherein at least 12% by weight of the total hard segments in said polymer molecules are divalent radicals of the formula:

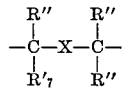

wherein said divalent radicals are each attached to NH, R″ is a lower alkyl radical selected from the class consisting of methyl, ethyl, and n-propyl; X is a radical selected from the class consisting of (a) p-phenylene,
(b) p-xylylene,
(c) 1,4-cyclohexylene,
(d) 4,4-biphenylene,
(e) 1,4-naphthylene,
(f) 1,5-naphthylene,
(g) 2,6-naphthylene,

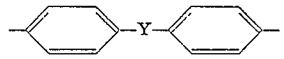

wherein —Y— is selected from the class consisting of —CH$_2$—, —CH$_2$CH$_2$—, —O—,

—S—, —SO—, and —SO$_2$—,
(i) radicals as defined in (b), (d), (e), (f), (g), and (h) hydrogenated in the ring, and
(j) radicals as defined in (a), (b), (c), (d), (e), (f), (g), (h), and (i) having substituted on the ring at at least one substituent of the class consisting of methyl, methoxy, and ethyl.

2. The spandex fiber of claim 1 wherein each R″ is methyl and X is p-phenylene.

3. The spandex fiber of claim 1 wherein said amorphous polymer is a urethane-interrupted polyalkylene-ether glycol.

4. The spandex fiber of claim 1 wherein said amorphous polymer is a urethane-interrupted polyester glycol.

5. An elastic fiber of a segmented polymer consisting essentially of recurring units of the formula:

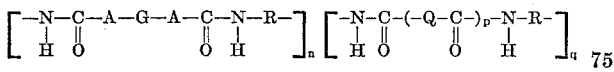

wherein
—G— is the residue remaining after removal of the terminal functional groups from an amorphous polymer having a melting point below 60° C. and a molecular weight above 600, said amorphous polymer being selected from the group consisting of hydroxyl-terminated polyethers, polyesters, copolyether-esters, polyacetals, polysiloxanes, polymers of the foregoing types containing urethane groups in the chain, hydroxyl-terminated N-alkylated polyurethanes, and amine-terminated copolyamides, copolyurethanes, and polyhydrocarbons;
—A— is selected from the class consisting of —O— and

—Q— is a non-polymeric radical obtained by the removal of one hydrogen atom from each of two functional groups of a polyfunctional compound selected from the class consisting of organic polyamines containing at least two NH$_2$ groups each attached to separate carbon atoms not part of a benzenoid ring, organic polyols containing at least two alcoholic hydroxyl groups, hydrazine, hydrazides containing at least two —NHNH$_2$ groups attached to carbonyl and piperazines containing two > groups or two >N—NH$_2$ groups;
RR is a radical selected from the group consisting of (1)

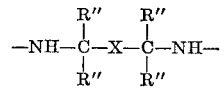

(2) —alk—ar—alk—,
(3) —cyc—,
(4) —alk—cyc—alk—,
(5) —cyc—cyc—,
(6) —alk—cyc—cyc—alk—,
(7) —cyc—alk—cyc—,
(8) —alk—cyc—alk—cyc—alk—,
(9) alkylene radicals containing from 2 to about 6 carbon atoms, wherein Ar represents a benzene ring, alk represents an alkylene radical containing from 1 to 3 carbon atoms, and cyc represents a cycloaliphatic ring containing from 3 to 6 carbon atoms in the ring;
$n$ and $q$ are small positive integers from 1 through about 8;
$p$ is an integer selected from the class consisting of zero and 1;
with the proviso that at least 33 mol percent of the sum of the radicals —Q— and —NH—R—NH— in the polymer are radicals of the formula $$-NH-\underset{R''}{\overset{R''}{\underset{|}{\overset{|}{C}}}}-X-\underset{R''}{\overset{R''}{\underset{|}{\overset{|}{C}}}}-NH-$$

wherein

R″ is a lower alkyl radical selected from the class consisting of methyl, ethyl, and n-propyl,
X is a radical selected from the class consisting of (a) p-phenylene,
(b) p-xylylene,
(c) 1,4-cyclohexylene,
(d) 4,4′-biphenylene,
(e) 1,4-naphthylene,
(f) 1,5-naphthylene,
(g) 2,6-naphthylene,

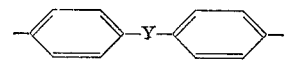

wherein —Y— is selected from the class consisting of —CH$_2$—, —CH$_2$CH$_2$—, —O—,

—S—, —SO—, and —SO$_2$—, (i) radicals as defined in (b), (d), (e), (f), (g), and (h) hydrogenated in the ring, and
(j) radicals as defined in (a), (b), (c), (d), (e), (f), (g), (h), and (i) having substituted on the ring at least one substituent of the class consisting of methyl, methoxy, and ethyl.

6. An elastic fiber of a segmented polymer according to claim 5 wherein G is the radical remaining after removal of the terminal hydroxyl groups from a polyalkyleneether glycol.

7. An elastic fiber of a segmented polymer according to claim 6 wherein said polyalkyleneether glycol is polytetramethyleneether glycol.

8. An elastic fiber of a segmented polymer according to claim 5 wherein G is the radical remaining after removal of the terminal hydroxyl groups from a polyester glycol.

9. An elastic fiber of a segmented polymer according to claim 5 wherein each R radical is the residue remaining after removal of isocyanate radicals from α,α,α′,α′-tetramethyl-p-xylylene diisocyanate.

10. An elastic fiber of a segmented polymer according to claim 5 wherein each Q radical is the residue remaining after removal of a hydrogen atom from each NH$_2$ of α,α,α′,α′-tetramethyl-p-xylylene diamine.

11. An elastic fiber of a segmented polymer according to claim 5 wherein said polymer contains on an average less than about one cross-link for each 2000 molecular weight portion of the polymer chain.

12. An elastic fiber of a segmented polymer according to claim 5 wherein said recurring units are substantially linear.

13. An elastic fiber of a segmented polymer according to claim 5 wherein at least 80 mol percent of R is

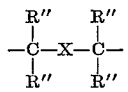

14. An elastic fiber of a segmented polymer according to claim 5 wherein at least 80 mol percent of Q is

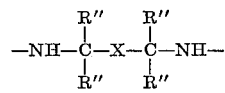

References Cited

UNITED STATES PATENTS

| | | | |
|---|---|---|---|
| 3,097,192 | 7/1963 | Schilit | 260—75 |
| 2,929,804 | 3/1960 | Steuber | 260—77.5 |
| 2,723,265 | 11/1955 | Stallmann | 260—77.5 XR |
| 3,115,479 | 12/1963 | Windemuth et al. | 260—47 |
| 3,180,854 | 4/1965 | Schneider et al. | 260—77.5 |
| 3,290,350 | 12/1966 | Hoover | 260—453 |
| 3,305,533 | 2/1967 | Thoma et al. | 260—75 |
| 3,377,308 | 4/1968 | Oertel et al. | 260—32.6 |
| 3,386,942 | 6/1968 | Bell et al. | 260—37 |

FOREIGN PATENTS

| | | |
|---|---|---|
| 846,176 | 8/1960 | Great Britain. |
| 1,299,557 | 6/1962 | France. |

OTHER REFERENCES

Hoover et al., "Journal of Organic Chemistry," vol. 29 (1964), pp. 143–145.

DONALD E. CZAJA, Primary Examiner

H. S. COCKERAM, Assistant Examiner

U.S. Cl. X.R.

260—46.5, 67, 77.5, 78

PO-1050
(5/69)

UNITED STATES PATENT OFFICE
CERTIFICATE OF CORRECTION

Patent No. 3,507,834           Dated     April 21, 1970

Inventor(s)   Emerson La Verne Wittbecker

It is certified that error appears in the above-identified patent and that said Letters Patent are hereby corrected as shown below:

Column 17, line 35, Claim 1 the portion of the formula reading R⟍ should read R".

Column 17, line 43, Claim 1, "4,4-biphenylene" should read -- 4,4'-biphenylene --.

Column 17, lines 47 - 49, Claim 1, the formula should be prefaced by -- (h) --.

Column 18, line 27, Claim 5, "two > groups" should read -- two > NH groups --.

Column 18, line 28, Claim 5, "RR" should read -- R --.

Column 18, line 72, Claim 5, the formula should be prefaced by -- (h) --.

Signed and sealed this 10th day of August 1971.

(SEAL)
Attest:

EDWARD M. FLETCHER, JR.                      WILLIAM E. SCHUYLER, JR.
Attesting Officer                               Commissioner of Patents